(12) United States Patent
Andrews et al.

(10) Patent No.: US 8,230,995 B2
(45) Date of Patent: Jul. 31, 2012

(54) CONTAINER AND PACKAGING METHOD FOR VEGETATION TRIMMER LINE

(75) Inventors: Jeff Andrews, Mesa, AZ (US); Robert Phillips, Scottsdale, AZ (US); Allen W. Christmann, Phoenix, AZ (US); Terry J. Thompson, Mesa, AZ (US)

(73) Assignee: Desert Extrusion Corporation, Phoenix, AZ (US)

( * ) Notice: Subject to any disclaimer, the term of this patent is extended or adjusted under 35 U.S.C. 154(b) by 29 days.

(21) Appl. No.: 12/768,552

(22) Filed: Apr. 27, 2010

(65) Prior Publication Data

US 2011/0258861 A1 Oct. 27, 2011

(51) Int. Cl.
*B65D 85/671* (2006.01)
(52) U.S. Cl. .......................... 206/403; 206/408; 206/409
(58) Field of Classification Search .................. 206/471, 206/467, 469, 470, 389, 397, 398, 403, 408, 206/409
See application file for complete search history.

(56) References Cited

U.S. PATENT DOCUMENTS

| | | | | |
|---|---|---|---|---|
| 2,364,262 A * | 12/1944 | Wehringer | ..................... | 242/388 |
| 3,032,228 A * | 5/1962 | Andrews | ..................... | 220/4.24 |
| 3,355,123 A * | 11/1967 | Schinske | ..................... | 242/396.5 |
| 4,399,950 A * | 8/1983 | Pedersen | ..................... | 242/434.2 |
| 5,099,994 A * | 3/1992 | Kalinski et al. | ................ | 206/409 |
| 5,653,345 A * | 8/1997 | Knoss et al. | ................ | 206/521.6 |
| 5,842,567 A * | 12/1998 | Rowe et al. | ................... | 206/364 |
| 5,871,091 A * | 2/1999 | Fogle | ............................ | 206/205 |
| 5,894,914 A * | 4/1999 | Jubin | ............................ | 190/119 |
| 5,992,787 A * | 11/1999 | Burke | ........................ | 242/388.1 |
| 6,109,005 A * | 8/2000 | Fogle | ............................ | 53/430 |
| 6,491,163 B1 * | 12/2002 | Grcic et al. | ................... | 206/403 |
| 7,007,442 B1 * | 3/2006 | Fogle | ............................ | 53/393 |
| 7,032,854 B2 * | 4/2006 | Marsden | ................... | 242/388.1 |
| 7,654,484 B2 * | 2/2010 | Mogensen et al. | ............ | 242/402 |
| 2003/0151890 A1 * | 8/2003 | Huang et al. | ................. | 361/683 |

* cited by examiner

*Primary Examiner* — Jacob K Ackun
(74) *Attorney, Agent, or Firm* — Etherton Law Group, LLC; Benjamin D. Tietgen; Sandra L. Etherton

(57) ABSTRACT

A substantially toroidal container for coiled vegetation trimmer line has a front shell and a rear shell capable of bonding at the center with heat and pressure, radio frequency, ultrasonic welding, adhesive, or attachment mechanisms. The bonding of the shells leaves a separation between the outer edges of the shells. The separation is nonlinear around the circumference of the container, so that a user can access the trimmer line, but the trimmer line cannot uncoil and spill out of the container. The separation is preferably defined by a series of offset uniform teeth on the outer edges of the shells. One or more teeth may be removed, providing a line aperture through which the end of the trimmer line extends out of the container. Male and female indices on each shell are used to align the teeth during packaging.

2 Claims, 9 Drawing Sheets

US 8,230,995 B2

CONTAINER AND PACKAGING METHOD FOR VEGETATION TRIMMER LINE

FIELD OF INVENTION

This invention relates to vegetation trimmer line. This invention relates particularly to an apparatus and method for packaging vegetation trimmer line.

BACKGROUND

Vegetation trimmers using flexible trimmer lines are in widespread use. Generally, the trimmer line that is used in rotating string trimmers is manufactured or extruded of nylon materials. The trimmer lines may have various cross-sectional shapes, such as round, oval, square, and multi-lobal. The cross-sectional diameters of the line used in the trimmers vary from larger cross-sectional diameters for commercial trimmers to smaller diameters in the trimmers sold for home use. The diameter at its largest point is generally in the range of 0.050 to 0.170 inches.

Certain types of vegetation trimmers have trimmer line wound and stored on a reel or spool that fits in the housing of the head of the device. The line is played out from the reel in discrete amounts as the line breaks off or wears down. When the supply of line on the storage reel is used up, additional line is provided from a continuous length of replacement line supplied in a trimmer line package. The amount of line that is provided in such packages typically is equal to the amount of line wound on a storage reel, or it is in excess of the amount of line which can be wound on a reel, thereby providing more than one reel's worth of line replacement.

One way of packaging replacement line is to coil the desired length into a toroidal container, known as a donut. Some donut containers are completely sealed and must be opened to take out any line. Another type of donut container is split into two halves that interface with each other around the outer circumference of the container. At the periphery of the container, the halves may abut each other or be separated by a small gap. In either case, the abutment or gap is planar or linear and allows trimmer line to be pulled out of the container. However, trimmer line is resistant to coiling, and the coils expand if they are unbound. In the known split-donut container, when the line begins to uncoil, such as during shipping of the package, the expanding coils easily push their way through the abutment or gap and out of the container. The line must then be rewound into the container upon arrival at a retail facility, or, worse, the line is not rewound and the container is put on the shelf with the trimmer line sticking out of it. A donut container that can contain unbound trimmer line while providing easy access to the line is needed.

Another problem arises during shipping when many donut containers are packed together. It is common for the containers to rub against each other when they are jostled, scratching the facing surfaces of the containers. Depending on the material used for the packages, the damage caused can be so severe as to render opaque an otherwise transparent package. A donut container that limits or prevents this kind of damage is needed.

Therefore, it is an object of this invention to provide a container for coiled trimmer line that retains the line in the package but allows easy access to the line. It is a further object that the container be toroidal. Another object of this invention is to provide a trimmer line container that is an improvement over existing donut-shaped containers. A further object is to provide a container that limits surface damage from other containers during shipment. Another object is to provide a method for packaging trimmer line in a toroidal package.

SUMMARY OF THE INVENTION

A container for coiled vegetation trimmer line has a front shell and a rear shell that have substantially the same periphery. Each shell is plastic and has a bonding surface on which a bond between the shells is formed using heat and pressure, radio frequency, or ultrasonic welding. Once bonded together, the outer edges of the shells may abut each other or be separated by a small gap around the circumference of the container, so that a user can access the trimmer line. A series of offset teeth are formed on the outer edges of the shells to prevent the trimmer line from uncoiling and spilling out of the container. The teeth may be squared or curved, but are preferably curved. One or more teeth may be removed to form a line aperture that allows one end of the trimmer line to extend out of the container without spreading the teeth apart. One or more index modules comprising male and female indexes are used to align the teeth during packaging. One or more spacers may be positioned on the front shell, back shell, or both shells, in order to separate the container from other containers in a shipping box. To package the trimmer line in the container, the rear shell is placed in a bonding machine. A bound coil of trimmer line is placed in the rear shell. The front shell is lowered onto the rear shell and rotated until the male and female indexes align. The shells are bonded at their respective bonding surface, and the coil is unbound. Alternatively, the shells may be bonded with the container empty, and trimmer line may be inserted into the container, coiling around the center.

DETAILED DESCRIPTION OF THE INVENTION

Figure 1:
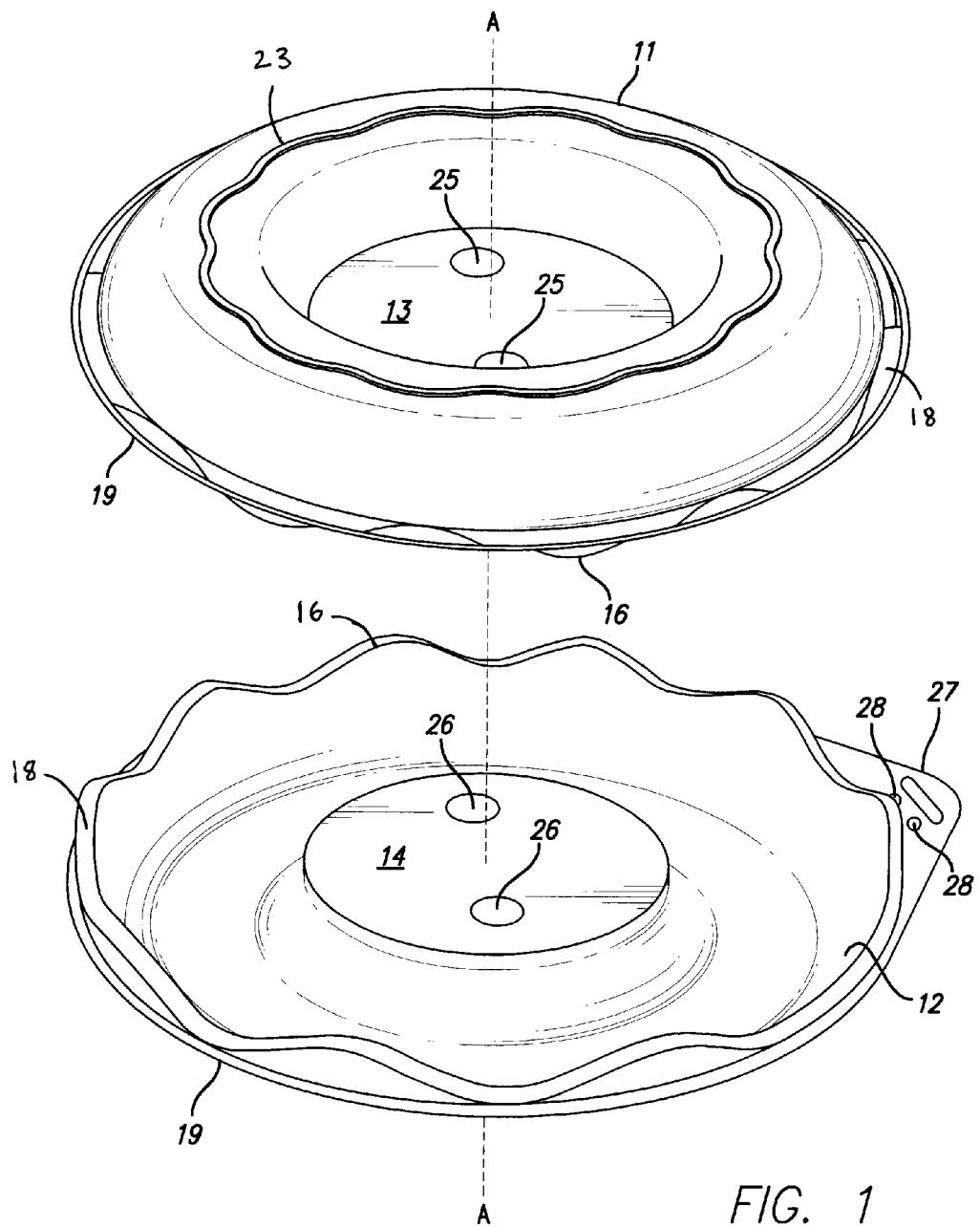
FIG. 1 is an exploded perspective view of the preferred embodiment of the present invention, showing the front and rear shells.
Figure 2:
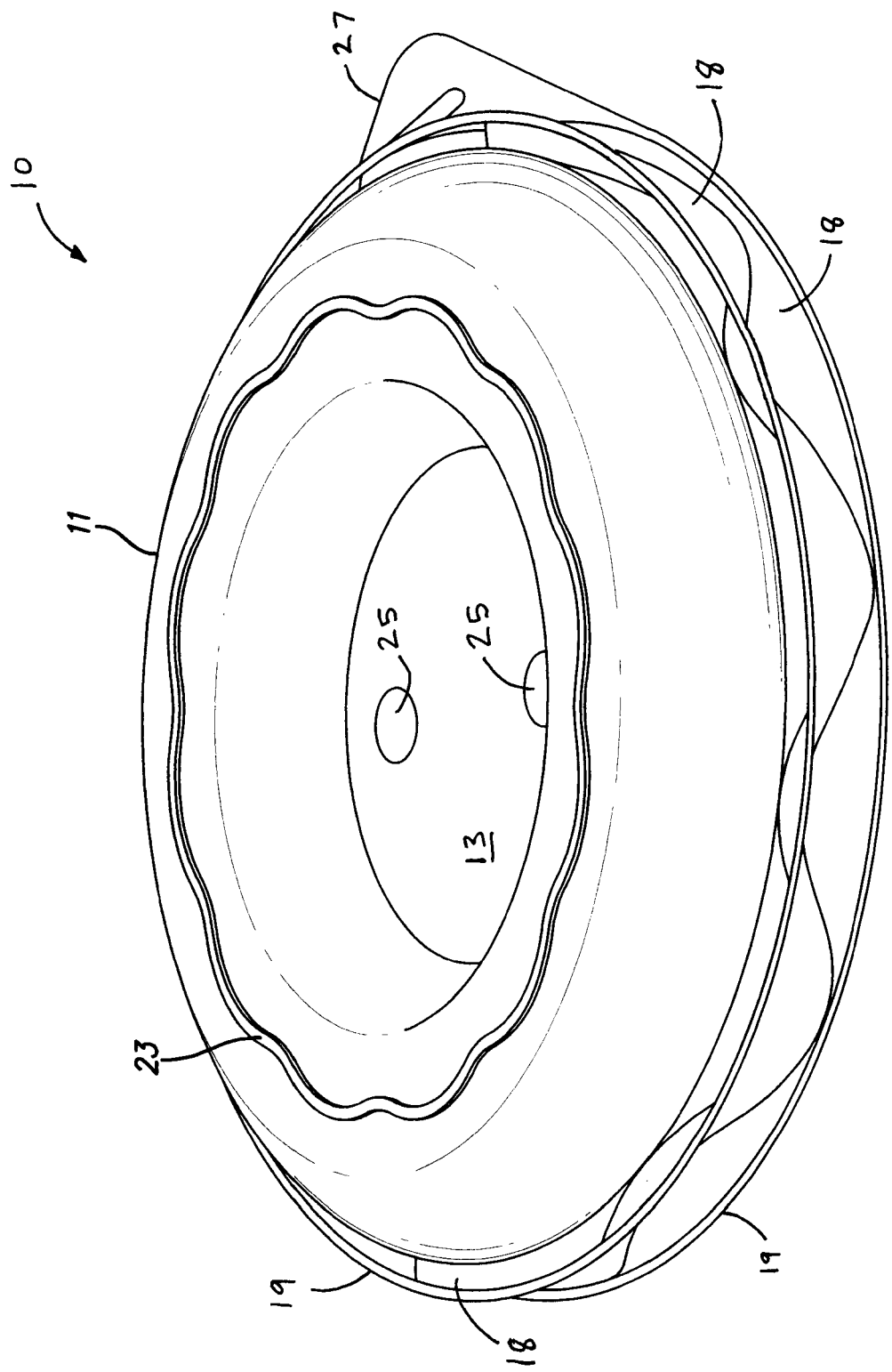
FIG. 2 is a perspective view of the container of FIG. 1 having abutting outer edges and a wavy ring spacer.

Referring to FIGS. 1 and 2, there is illustrated the preferred embodiment of the present invention, designated generally as 10, which is a container for a coil of replacement trimmer line. The container 10 preferably has a substantially toroidal shape with a cross-sectional shape 60 that is rotated around a central axis A-A. See FIG. 1 and FIG. 7. The cross-sectional shape 60 may be any shape capable of retaining the coiled trimmer line within the container 10, such as a square, diamond, rectangle, trapezoid, other polygon, circle, oval, ovoid, ellipse, or other rounded shape. Preferably, the cross-sectional shape 60 is a rectangle having semicircular ends of equal radius. The volume inside the cross-sectional shape 60 rotated 360 degrees around the axis A-A defines the space for storing the trimmer line. Alternatively, the container 10 may be another shape, such as circular or square.

The container 10 may be divided into a front shell 11 and a rear shell 12, which are preferably separately manufactured. Each shell 11, 12 preferably comprises about half of the toroid, although in alternative embodiments the front shell 11 or rear shell 12 may be different sizes or shapes. For example, the rear shell 12 may be flat, resulting in a half-toroid container 10. In another example, one shell may be substantially larger than its counterpart. The shells 11, 12 are made of plastic, preferably one or more thermoplastic polymers such as polyethylene terephthlate ("PET") and polyvinyl chloride ("PVC"). The shells 11, 12 may have the same or different degrees of flexibility and resiliency. Preferably, the shells 11, 12 are sufficiently flexible to allow a user to reach into the container 10 and pull out an end of the trimmer line, returning to their original shape after the line is removed.

The front shell 11 and rear shell 12 each have an outer edge. In the preferred embodiment, the front and rear outer edges are substantially on the outer circumference of the toroid. The interface of the front outer edge with the rear outer edge defines a separation 15 between the shells 11, 12. In the preferred embodiment, the separation 15 has substantially no width, as the front outer edge abuts the rear outer edge. See FIG. 2. In alternative embodiments, the front outer edge may be disposed slightly apart from the rear outer edge, so that the separation 15 is a gap having a width W that may be wider or thinner than the trimmer line. See FIGS. 5 and 6A-D. The width W may be uniform or nonuniform around the outer circumference of the container 10. In any embodiment, the front shell 11, rear shell 12, or both, are sufficiently flexible and resilient to deform and allow trimmer line to be pulled through the separation 15, subsequently reassuming their respective shapes.

Figure 3A:
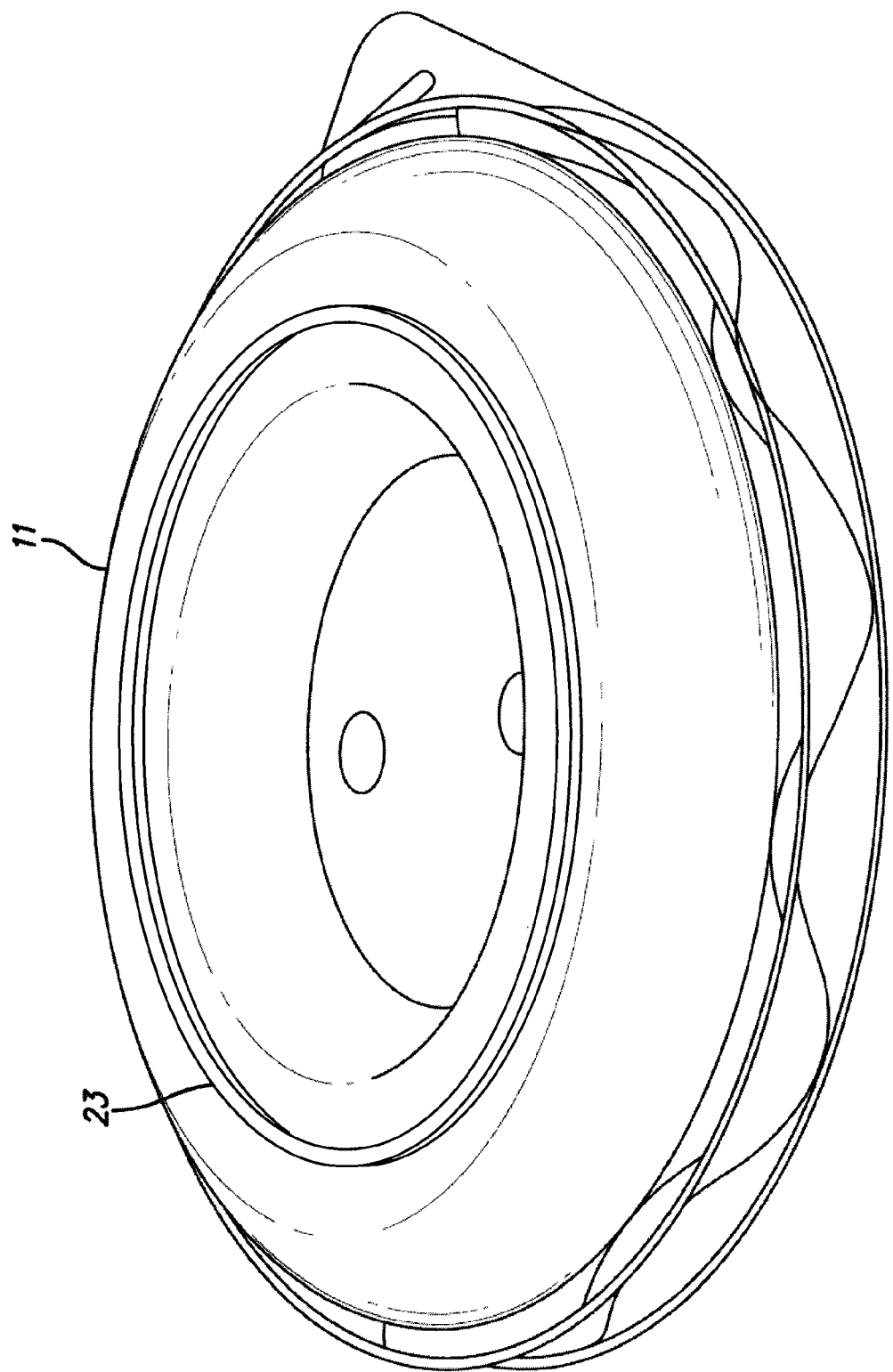
FIG. 3A is a perspective view of a container with a ring spacer on the front shell.
Figure 3B:
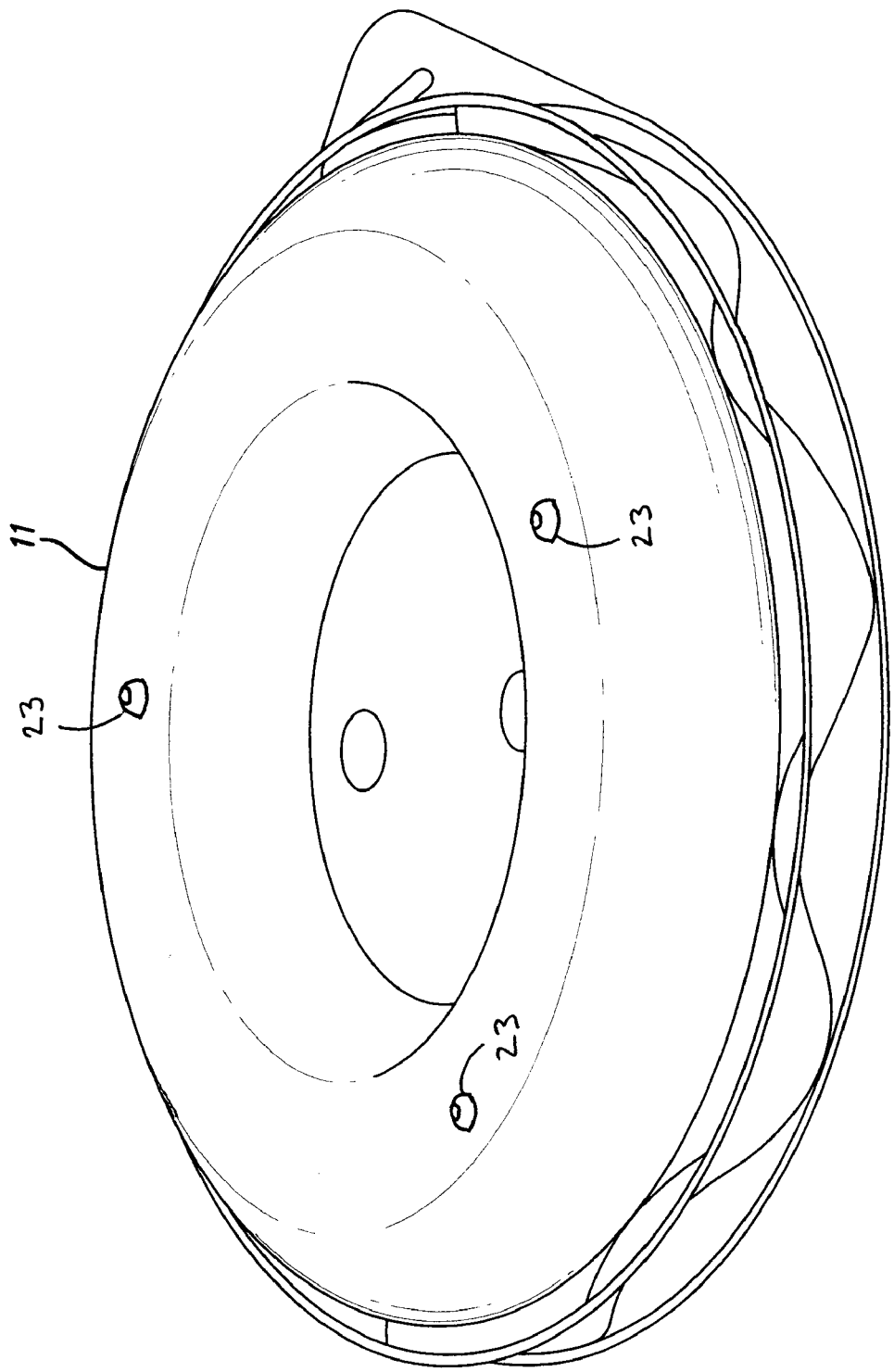
FIG. 3B is a perspective view of a container with node spacers on the front shell.
Figure 4:
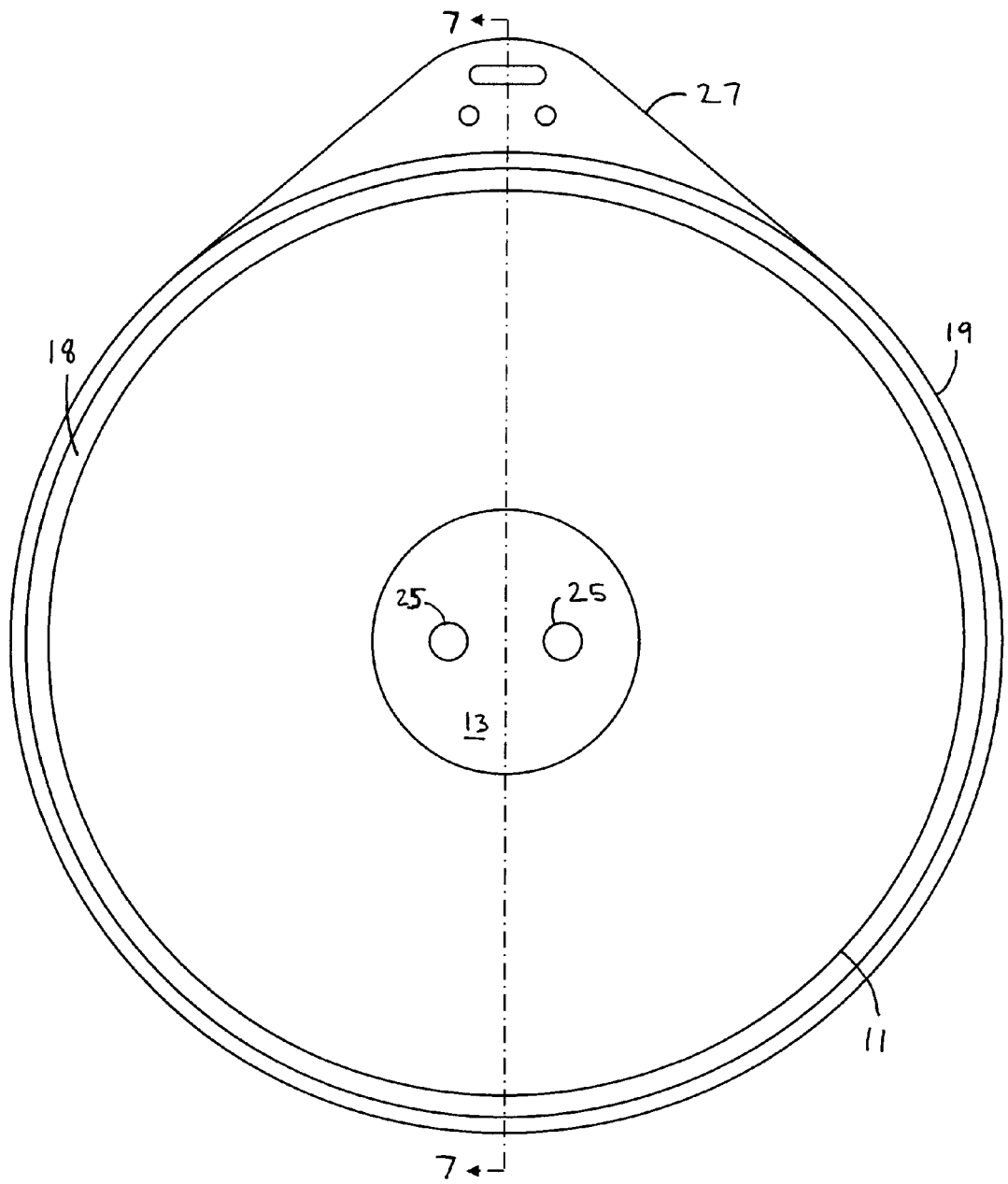
FIG. 4 is a front view of a container without a spacer.
Figure 5:
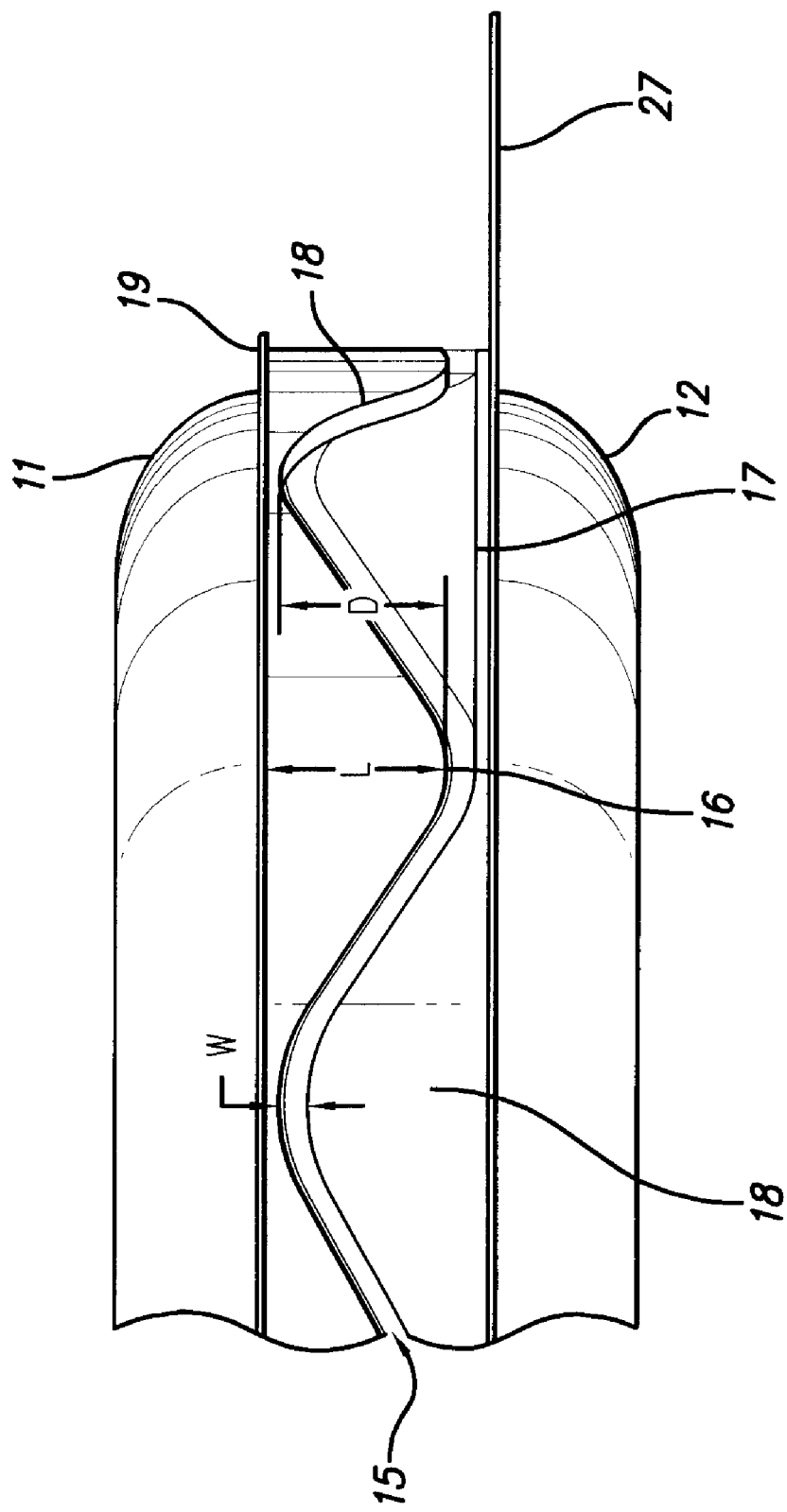
FIG. 5 is a right-side view of a container with non-abutting outer edges.

Referring to FIGS. 1-3B, one or both of the front shell 11 and rear shell 12 may have one or more spacers 23 attached to or integral with the outer surface of the shell. A spacer 23 is designed to separate the container 10 from other articles, such as other containers or box walls, that might scratch the outer surface of the shell on which the spacer 23 is positioned. The spacer 23 may be any shape and height that protects the shell, and is preferably flat or rounded on top so as not to damage articles that it contacts. For example, the preferred spacer 23 is a wavy ring shown in FIGS. 1 and 2, which emulates the shape of the preferred outer edges of the shells 11, 12. FIG. 3A illustrates a ring spacer 23 and FIG. 3B illustrates a series of three node spacers 23 on the front shell 11.

Figure 6A:
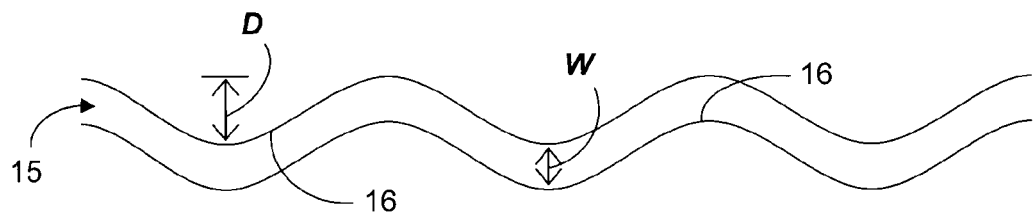
FIG. 6A is a side view showing one embodiment of a spacing between non-abutting outer edges in profile.
Figure 6B:
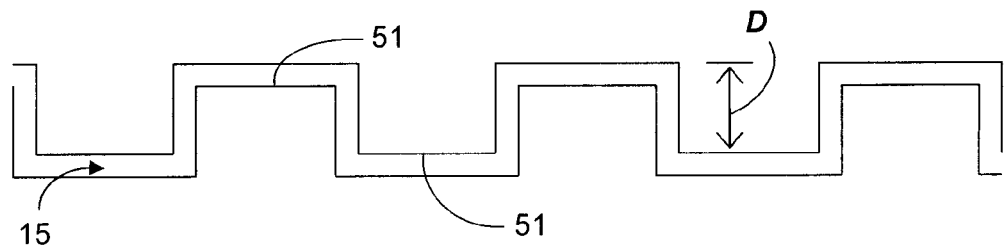
FIG. 6B is a side view of an alternative embodiment of FIG. 6A, showing an interlocking outer edge with squared teeth.
Figure 6C:
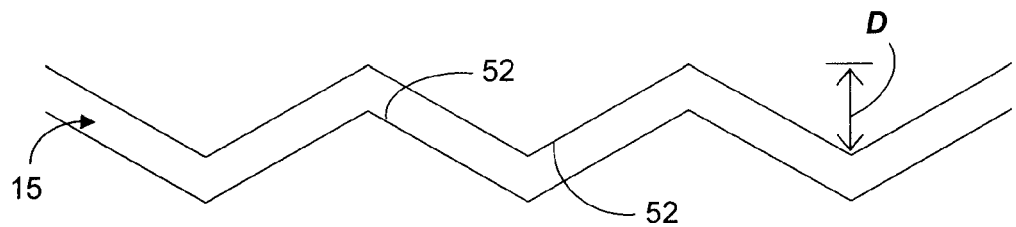
FIG. 6C is a side view of another alternative embodiment of FIG. 6A, showing a zigzagged outer edge with triangular teeth.
Figure 6D:
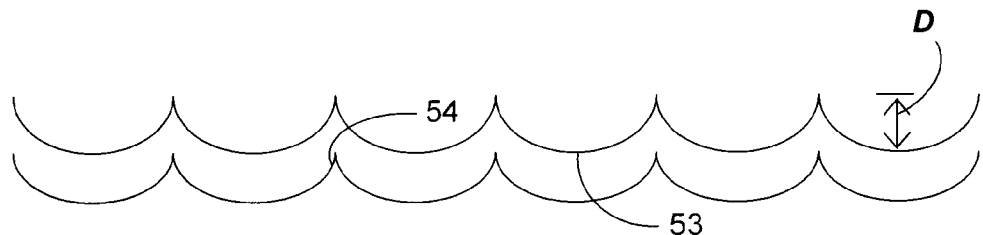
FIG. 6D is a side view of another alternative embodiment of FIG. 6A, showing a scalloped outer edge.

The front and rear outer edges are formed into cooperating shapes around the outer circumference, so that the separation 15 is not a straight line. The cooperating shapes on the outer edges may be uniformly or nonuniformly repeated around the outer circumference, and may be uniform or nonuniform in size, so long as the front outer edge interfaces with the rear outer edge to maintain a nonlinear or nonplanar separation 15. As shown in FIG. 2, the preferred container 10 may be considered to have "ribbed" outer edges with rounded teeth 16 protruding from one shell into the space between adjacent rounded teeth 16 on the opposite shell. See also FIG. 6A. In the preferred embodiment, the rounded teeth 16 have uniform size and spacing, creating an undulating separation 15 around the container 10. FIGS. 6B-D illustrate alternative embodiments, which may be implemented with abutting or non-abutting outer edges. The embodiment of FIG. 6B has interlocking squared teeth 51 on the outer edges. FIG. 6C illustrates a "zigzagged" separation 15 formed by alternating triangular teeth 52. FIG. 6D illustrates "scalloped" edges, with the front outer edge formed into round teeth 53 and the rear outer edge having cooperating peaks 54. The present invention contemplates any combination of cooperating shapes forming a separation 15 that is sufficiently nonlinear to prevent the contained trimmer line from sliding or bursting out of the separation 15 as it naturally uncoils inside the container 10.

Figure 7:
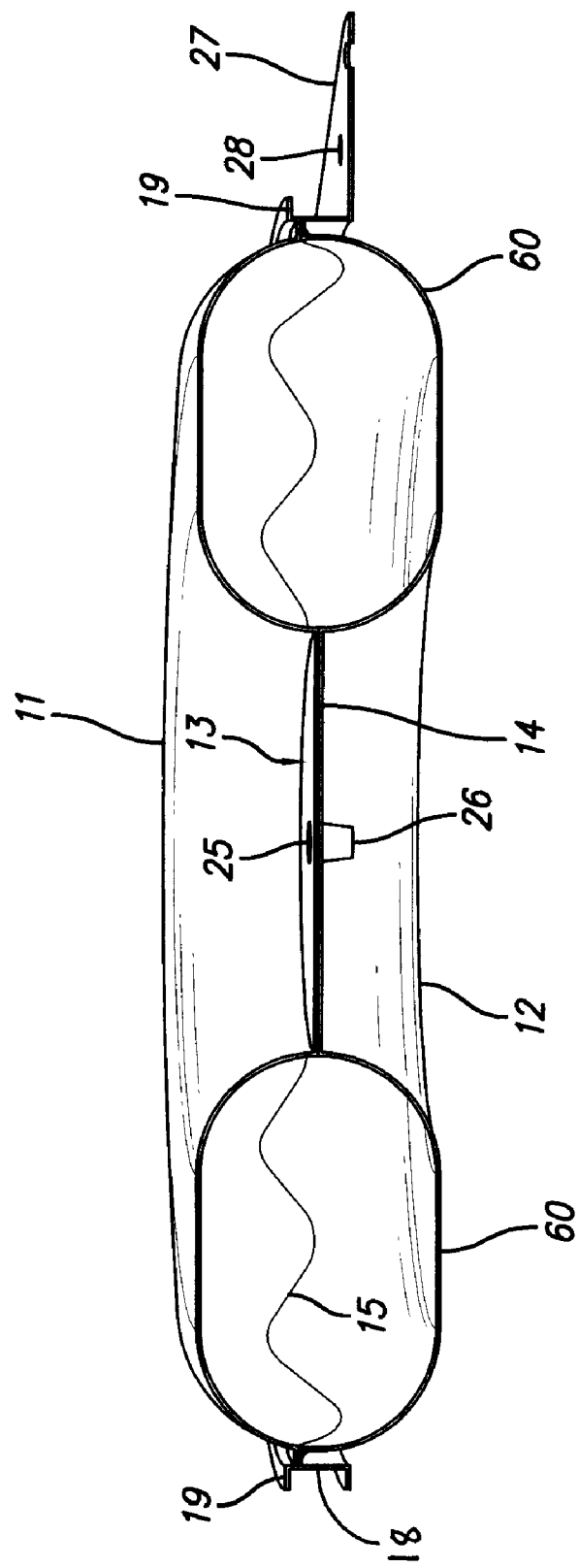
FIG. 7 is a right-side perspective cross-section of the container of FIG. 4, taken along line 7-7 of FIG. 4.

One or more of the cooperating shapes on one or both of the front shell 11 or rear shell 12 may be omitted from the cooperating pattern in order to provide a line aperture 17 on the outer circumference. The aperture 17 allows easier access into the container 10 than is provided by the separation 15. Additionally, the "loose" end of the trimmer line in the container 10 may extend out of the container 10 through the line aperture 17 to be retained outside the container 10 as described below. This keeps the trimmer line from widening the separation 15 at the point where it extends out of the container 10. Preferably, a single rounded tooth 16 is omitted from the rear outer edge near the top of the container 10 to create the line aperture 17. See FIG. 5. Structural support may be provided by a lip 18 and rim 19 molded integrally with each of the front shell 11 and back shell 12. The lips 18 are attached to each of the front and rear outer edges, extending substantially horizontally out from the outer edges, then extending substantially parallel to the container's 10 axis A-A, shown in FIG. 1, to a depth L shown in FIG. 5. The parts of the lips 18 that extend out from the outer edges may contact each other in embodiments having abutting outer edges. See FIG. 7, showing abutting lips 18 and the attached rims 19 in cross-sectional profile. The depth L is preferably slightly greater than the depth D of the rounded tooth 16. See FIG. 5. A rim 19 connected to each lip 18 extends horizontally outward from the lip 18, for preferably about 0.125 inches. A hang tab 27 for hanging the container 10 on a retail rack may be integral with the rim 19 on the front or rear shell 11, 12, preferably the rear shell 12. The hang tab 27 may have a set of line retention holes 28 through which the loose end of the trimmer line is passed to hold it, by friction, outside the container 10.

The front shell 11 has a front bonding surface 13 attached to or integral with the inner edge of the front shell 11, and the rear shell 12 has a rear bonding surface 14 attached to the inner edge of the rear shell 12. The bonding surfaces 13, 14 are aligned and subjected to a bonding process to attach the front shell 11 to the rear shell 12, forming the container 10. Preferably, the bonding surfaces 13, 14 are circular plastic discs that are integral with the shells 11, 12 and have a diameter equal to the inner diameter of the toroid. Alternatively, the bonding surfaces 13, 14 may be annular discs having enough surface area to ensure formation of a solid bond between the bonding surfaces 13, 14. The shells 11, 12 may be aligned, offsetting the teeth 16 to form the desired separation 15, using one or more indexing modules. The indexing modules are paired as a male index 25 and a female index 26 formed into the bonding surfaces 13, 14. The male and female indexes 25, 26 are the same size and shape, with the female index 26 being the inverse of the male index 25. The indexes 25, 26 may be any shape, such as triangular or quadrilateral pyramids, prisms, or cubes, and placed in any configuration that allows reliable indexing of the shells 11, 12. In one embodiment, a single pair of pyramid-shaped indexes 25, 26 may be used, the indexes 25, 26 having a regular or irregular polygonal base. For a regular polygon, the number of sides corresponds to the number of aligned positions in which the front shell 11 may be placed. For example, if a square base is used, the shells 11, 12 will align at 90 degree increments. Preferably, the front bonding surface 13 has two cylindrical male indexes 25 that project rearward, matching and aligning with cylindrical female indexes 26 on the rear bonding surface 14 that also project rearward.

Figure 8:
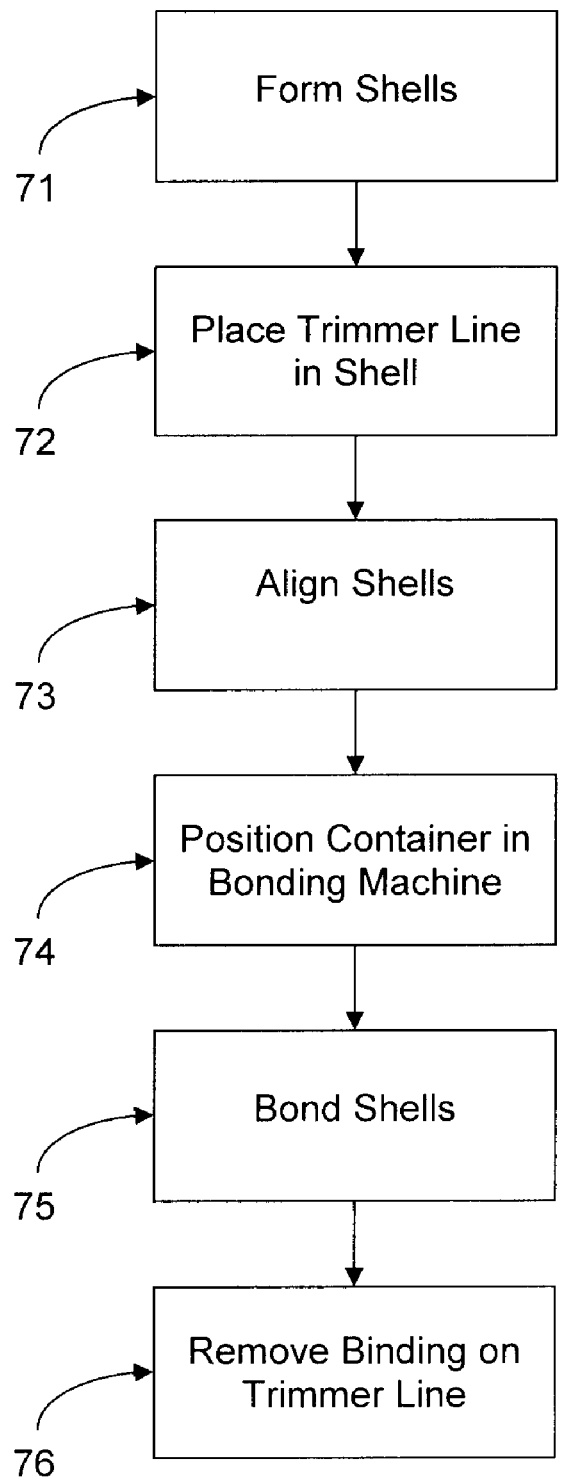
FIG. 8 is a flow diagram of a method for making the preferred container.

FIG. 8 illustrates a process of manufacturing the preferred container 10. The front and rear shells 11, 12 are separately formed 71, preferably by thermoforming sheets of the shell material. The desired amount of the desired trimmer line, having been previously or contemporaneously coiled and bound with a removable or temporary binding, is placed 72 in one of the shells 11, 12, preferably the rear shell 12. The shells 11, 12 are aligned 73 using the indexing modules 25, 26 and the bonding surfaces 13, 14 are brought into conforming contact. The container 10 is then positioned 74 in a bonding machine, which uses any technique for bonding thermoplastics, such as heat, pressure, radio waves, ultrasonic welding, or a combination of these. The bonding machine bonds 75 the front shell 11 to the rear shell 12 by melting parts of one or both bonding surfaces 13, 14. Finally, the binding on the coil of trimmer line is removed 76. Depending on the size and length of the trimmer line, the binding on the coil may be removed 76 earlier in the process if the trimmer line will remain substantially coiled without the restraining binding in place.

Alternative methods of manufacturing the container 10 are contemplated. The shells 11, 12 may be made by injection molding or another process used in plastics manufacturing, rather than thermoforming. In place of a melt bond, the front shell 11 may be attached to the rear shell 12 by an adhesive or an attachment mechanism such as staples, rivets, or mating tabs formed into the shells 11, 12. The front shell 11 may be attached to the rear shell 12 before the trimmer line is coiled and placed 72 in the container 10, or the front and rear shells 11, 12 may be integrally cast as a single piece. The empty finished container 10 may be placed in a feeding machine that feeds trimmer line so that it coils inside the container 10 while being fed into it. The trimmer line is then cut when the container 10 is full.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A container for a coil of trimmer line, the container comprising:
 a) a front shell having an outer edge formed into a series of teeth and a circular inner edge;
 b) a front bonding surface integral with the front shell at the inner edge of the front shell;
 c) a male index formed into the front bonding surface;
 d) a rear shell having
  i. an outer edge that abuts the outer edge of the front shell and is formed into a series of teeth; and
  ii. a circular inner edge having substantially the same diameter as the inner edge of the front shell;
 e) a rear bonding surface that is:
  i. integral with the rear shell at the inner edge of the rear shell; and
  ii. melt-bonded to the front bonding surface; and
 f) a female index formed into the rear bonding surface and configured to align with the male index to offset the teeth of the front shell from the teeth of the rear shell, creating an undulating separation between the outer edge of the top shell and the outer edge of the bottom shell.

2. The container of claim 1 further comprising one or more spacers formed into the outer surfaces of one or both of the front and rear shell, the spacers being configured to prevent other articles from contacting the outer surface of the shell into which they are formed.

* * * * *